US012379081B1

(12) United States Patent
Mao

(10) Patent No.: US 12,379,081 B1
(45) Date of Patent: Aug. 5, 2025

(54) LED WATER SPRAY PAD

(71) Applicant: Zhanzhang Mao, Dazhou (CN)

(72) Inventor: Zhanzhang Mao, Dazhou (CN)

( * ) Notice: Subject to any disclaimer, the term of this patent is extended or adjusted under 35 U.S.C. 154(b) by 0 days.

(21) Appl. No.: 19/184,674

(22) Filed: Apr. 21, 2025

(51) Int. Cl.

| | |
|---|---|
| ***F21S 10/00*** | (2006.01) |
| ***A63G 31/00*** | (2006.01) |
| ***B05B 1/14*** | (2006.01) |
| ***F21S 4/28*** | (2016.01) |
| ***F21S 9/02*** | (2006.01) |
| ***F21V 19/00*** | (2006.01) |
| ***F21V 33/00*** | (2006.01) |
| ***F21Y 103/33*** | (2016.01) |
| ***F21Y 115/10*** | (2016.01) |

(52) U.S. Cl.
CPC .......... *F21S 10/002* (2013.01); *A63G 31/007* (2013.01); *B05B 1/14* (2013.01); *F21S 4/28* (2016.01); *F21S 9/02* (2013.01); *F21V 19/0035* (2013.01); *F21V 33/008* (2013.01); *F21Y 2103/33* (2016.08); *F21Y 2115/10* (2016.08)

(58) Field of Classification Search
CPC ........ A63G 31/007; B05B 1/06; B05B 1/207; B05B 1/14; F21S 10/002; F21S 4/28; F21S 9/02; F21V 19/0035; F21V 33/008; F21Y 2103/33; F21Y 2115/10
See application file for complete search history.

(56) References Cited

U.S. PATENT DOCUMENTS 6,454,658 B1 * 9/2002 Drouin .................. A63G 11/00 472/109
9,901,836 B1 * 2/2018 Moreland ............... B05B 15/62
10,107,464 B2 * 10/2018 Hoffman ............. F21V 19/0055
2019/0185114 A1 * 6/2019 Voaklander ......... F21V 33/0084
2020/0271305 A1 * 8/2020 Kay .......................... F21K 9/20

* cited by examiner

*Primary Examiner* — Michael D Dennis
(74) *Attorney, Agent, or Firm* — Birchwood IP

(57) ABSTRACT

An LED water spray pad is provided, which includes a pad body provided with one or more water flow channels, the pad body is provided with one or more water spray holes that are penetrated through, and each water spray hole is communicated to the water flow channels; one or more light strips, provided on the pad body and configured to emit various colors of light; one or more water inlet members that are connected to the pad body to allow water to enter the water flow channels through the water inlet members. This application has the effect of increasing the attractiveness of the water spray pad.

5 Claims, 9 Drawing Sheets

LED WATER SPRAY PAD

TECHNICAL FIELD

The present disclosure relates to the field of water spray pad technologies, and in particular, to an LED water spray pad.

BACKGROUND

In the hot summer, people often cool off by playing in the water.

In the existing technology, there is a water spray pad including a water bag, a water inlet interface and a plurality of water spray holes are provided on the wall of the water bag. The water inlet interface is connected to an external water source to inject water into the water bag, and the water in the water bag is sprayed out through the water spray holes. When children play on the water spray pad, the water sprayed from the water spray holes can cool them down and relieve heat.

Regarding the above-mentioned related technologies, the variation of this water spray pad is relatively single and has little appeal to children.

SUMMARY

In order to increase attractiveness of a water spray pad, this application provides an LED water spray pad.

The LED water spray pad provided in this application adopts the following technical solution.

An LED water spray pad, including:

- a pad body, the pad body is provided with one or more water flow channels, the pad body is further provided with one or more water spray holes that are penetrated through, and each water spray hole is communicated to the water flow channels;
- one or more light strips, which are provided on the pad body and configured to emit various colors of light;
- one or more water inlet members, which are connected to the pad body to allow water to enter the water flow channels through the water inlet members.

By adopting the above technical solution, when using the water spray pad, water enters the water flow channels through the water inlet members and flows through each water spray hole along the water flow channels. Then, the water is sprayed from each water spray hole under its own pressure, thereby forming a water spray effect. At the same time as the water is sprayed from each water spray hole, the light strips placed on the pad body emit various colors of light, rendering the water spray pad more versatile and more attractive, thus improving the problem of relatively simple changes in the water spray pad and less attraction to children.

In some embodiments of the present disclosure, the light strips are provided in the water flow channels.

In some embodiments of the present disclosure, one or more fixing blocks are fixedly provided on an inner wall of the water flow channels, and each fixing block is provided with a fixing hole that is penetrated through; when the light strips are provided in the water flow channels, the light strips pass through each fixing hole to fix the light strips to the inner wall of the water flow channels.

In some embodiments of the present disclosure, the fixing blocks include a first fixing part and a second fixing part, where the first fixing part is fixedly connected to the inner wall of the water flow channels, one end of the second fixing part is rotatably connected to the first fixing part, and the other end of the second fixing part is detachably connected to the first fixing part.

In some embodiments of the present disclosure, the pad body includes a main body and a channel part, two sides of the channel part are fixedly connected to the main body part and form the water flow channels between the channel part and the main body part;

the channel part is made of transparent material.

In some embodiments of the present disclosure, the pad body is provided with a battery compartment, and a control module and a battery module are provided inside the battery compartment; the control module is electrically connected to the light strips and controls the light strips to emit light; the battery module is electrically connected to the control module.

In some embodiments of the present disclosure, the battery compartment is detachably connected with a battery cover, and the battery cover seals the battery compartment.

In summary, this application includes at least one beneficial technical effect as follows.

When using the water spray pad, water enters the water flow channels through the water inlet members and flows through each spray hole along the water flow channels. Then, the water is sprayed from each spray hole under its own pressure, thereby forming a spray effect. At the same time as the water is sprayed from each spray hole, the light strips provided on the pad body emit various colors of light, rendering the spray pad more versatile and more attractive, improving the problem of relatively simple changes in the spray pad and less attraction to children.

Numeral reference: 1—pad body; 10—water flow channel; 11—main body; 12—channel part; 121—water spray hole; 122—fixing block; 1220—fixing hole; 1221—first fixing part; 12211—clamp block; 1222—second fixing part; 12221—clamping slot; 123—battery compartment; 1231—control module; 1232—battery module; 1233—battery cover; 2—water inlet member; 3—light strip.

DESCRIPTION OF EMBODIMENTS

Further detailed explanation of the present application will be provided in combination with FIGS. 1-9.

Figure 1:
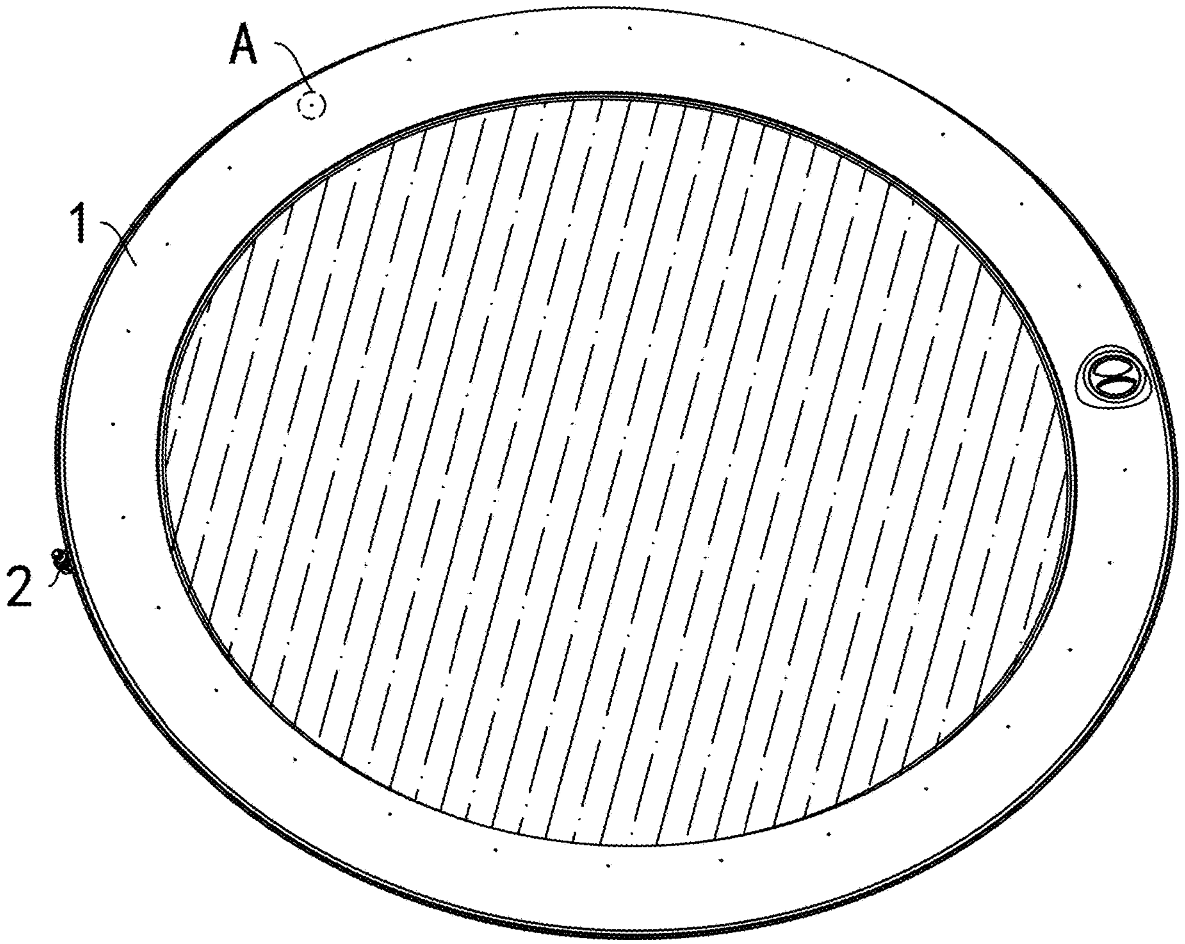
FIG. 1 is a first schematic diagram of an overall structure of an embodiment of the present application.
Figure 2:
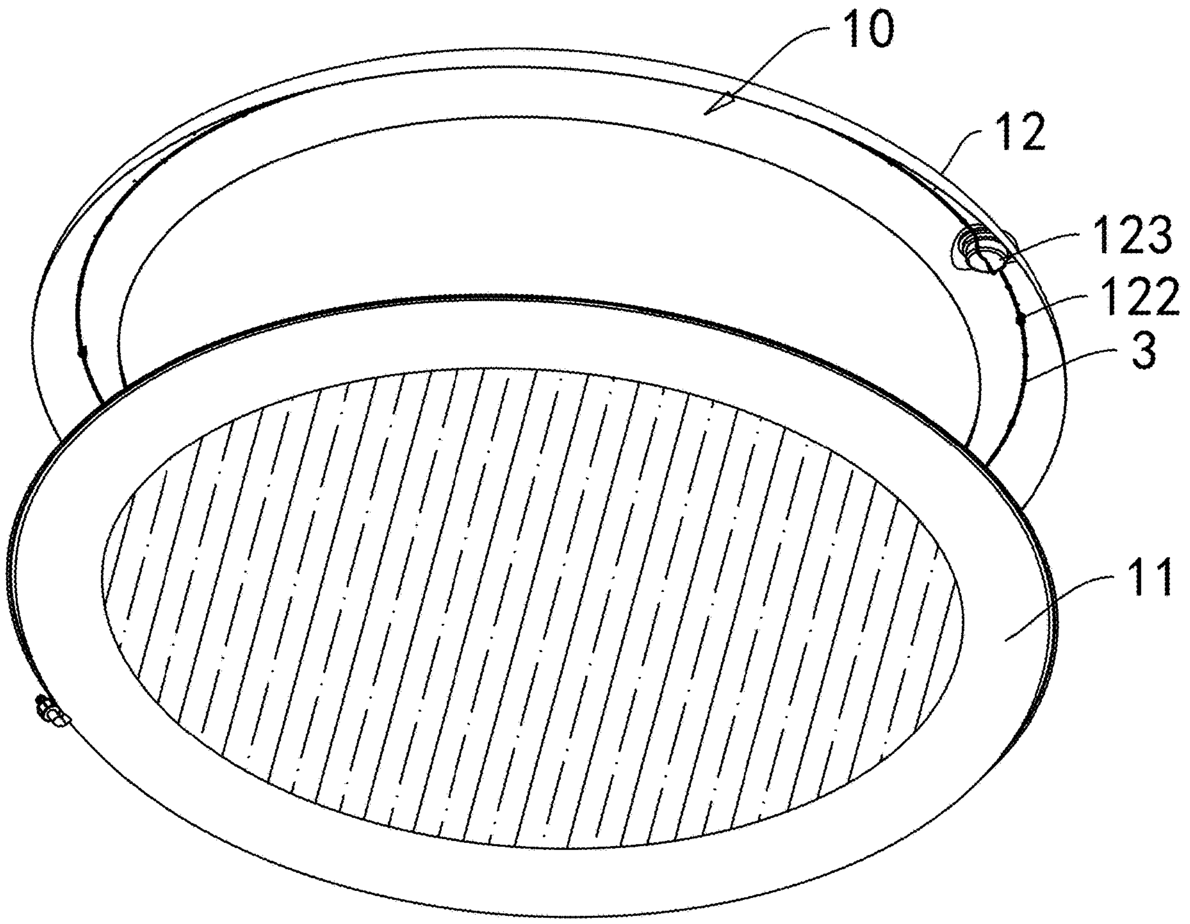
FIG. 2 is a schematic diagram of an internal structure of a water flow channel in an embodiment of the present application.
Figure 3:
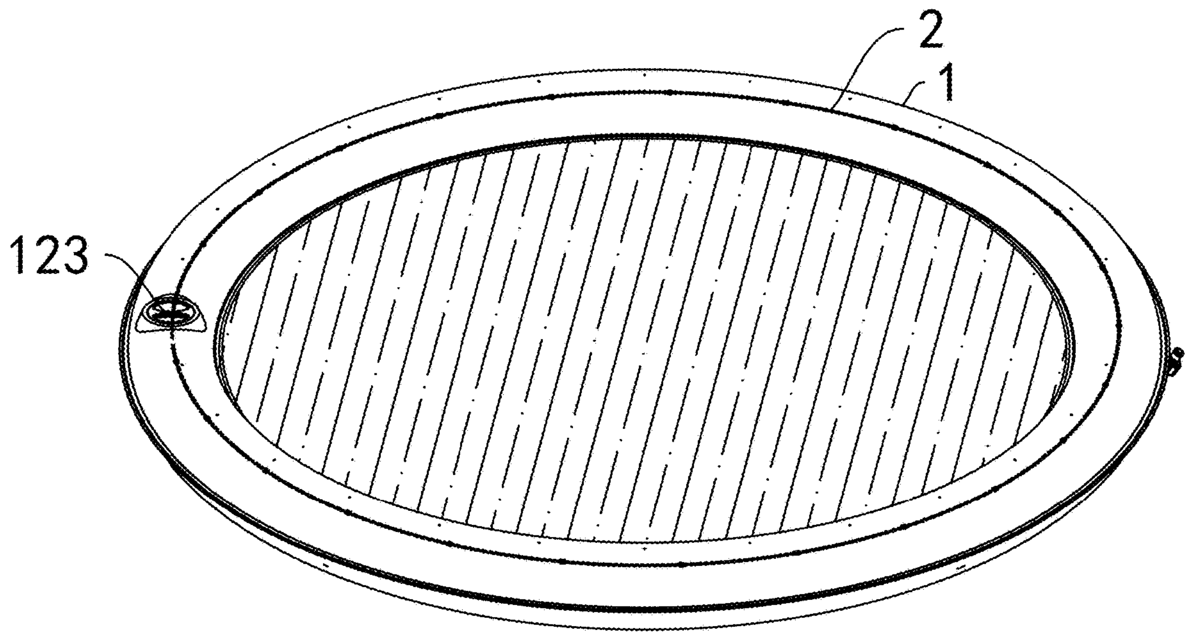
FIG. 3 is a second schematic diagram of the overall structure of the embodiment of the present application, and dashed line in the figure represents a light strip structure.

This application discloses an LED water spray pad. Referring to FIGS. 1, 2, and 3, the LED water spray pad includes a pad body 1, a water inlet member 2, and a light strip 3.

Referring to FIGS. 1, 2, and 3, in an embodiment of the present application, the pad body 1 is provided with a water flow channel 10. The pad body 1 includes a main body 11 and a channel part 12. The main body 11 is circular, and the channel part 12 is circular. An outer edge of the channel part 12 is heat pressed and fixed to an outer edge of the main body 11, and an inner edge of the channel part 12 is heat pressed and fixed to an inner side of the main body 11.

Figure 4:
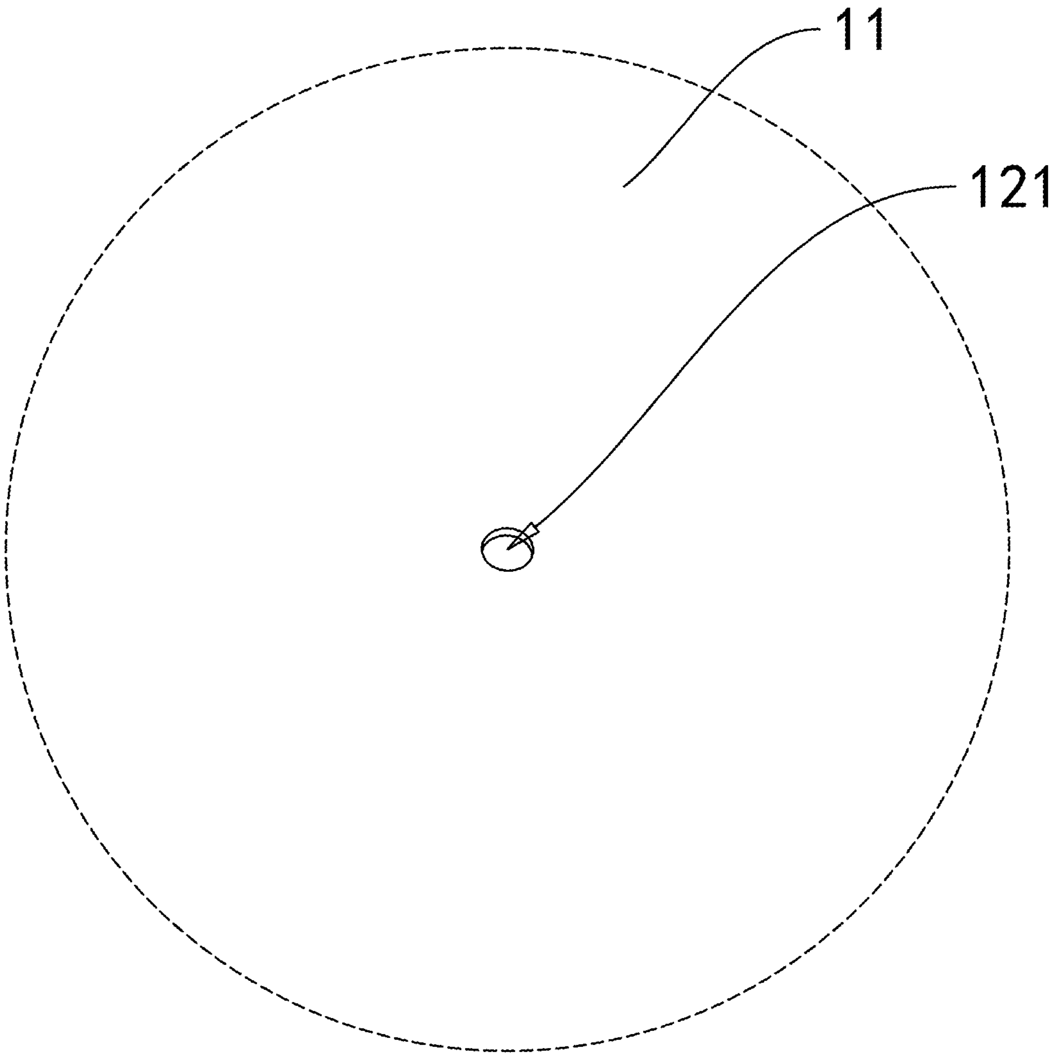
FIG. 4 is an enlarged view of part A of FIG. 1.

Referring to FIGS. 1, 2, and 4, the water flow channel 10 is located between the channel part 12 and the main body 11. The channel part 12 is connected to the main body 11 to form the water flow channel 10. In an embodiment of the present application, the main body 11 is made of opaque material, and the channel part 12 is made of transparent material. The channel part 12 is provided with a plurality of water spray holes 121 that are penetrated through, and each water spray hole 121 is communicated to the water flow channel 10. The water spray holes 121 are evenly distributed around an axis of the channel part 12.

Referring to FIGS. 1, 2, and 3, the water inlet member 2 is fixedly provided at a bottom of the main body 11 and communicated to the water flow channel 10, so that water enters the water flow channel 10 through the water inlet member 2 and provides an initial water pressure for the water entering the water flow channel 10, rendering it easier for water to spray out from each water spray hole 121. In an embodiment of the present application, the water inlet member 2 is selected as an inlet valve.

Figure 5:
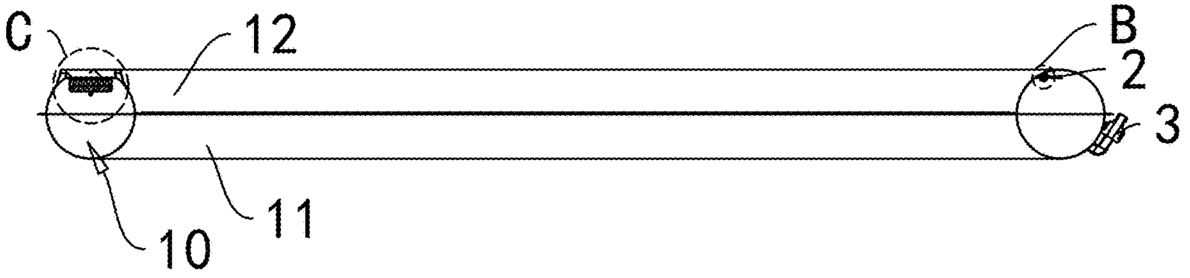
FIG. 5 is a sectional view of the overall structure of the embodiment of the present application.
Figure 6:
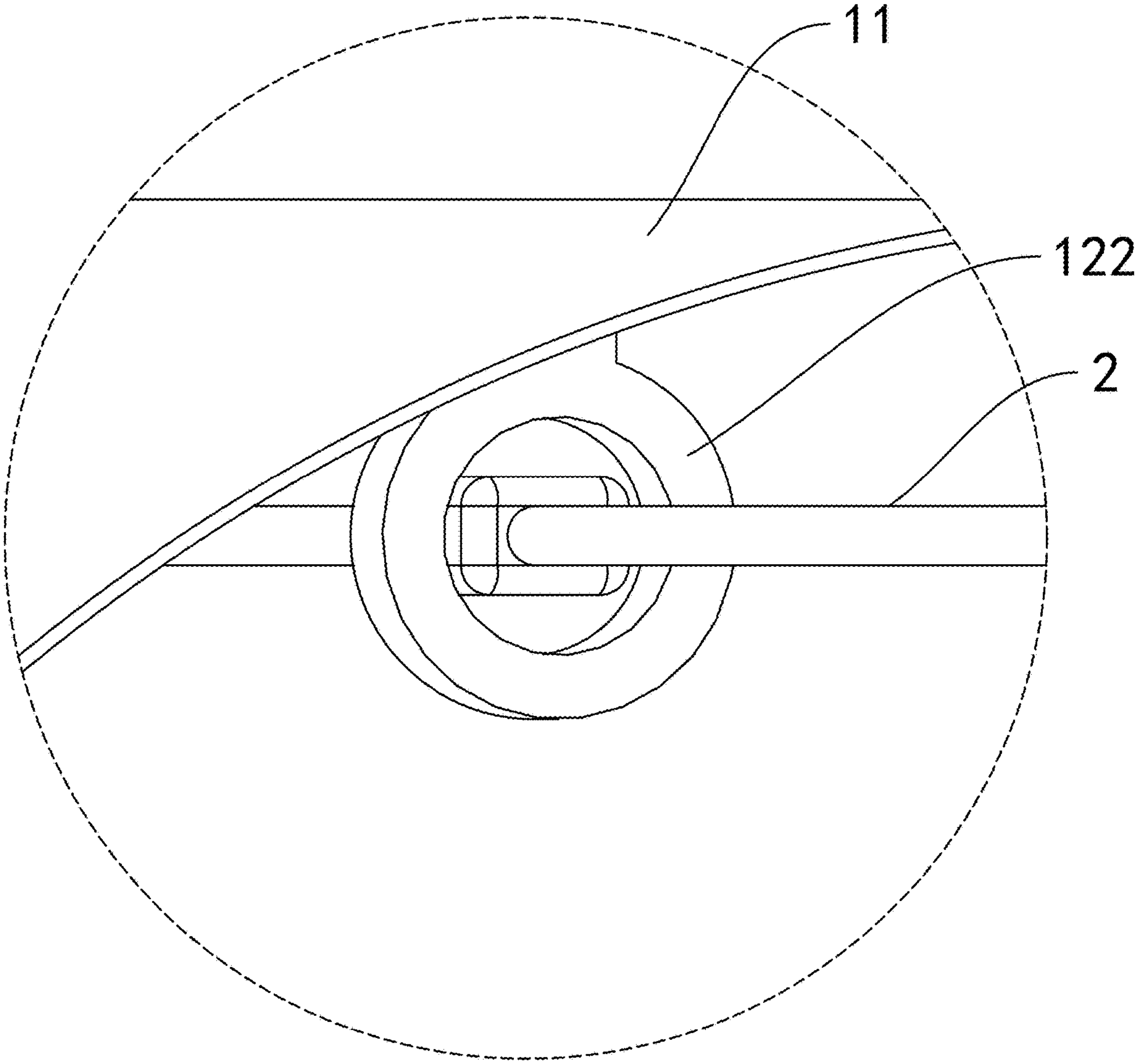
FIG. 6 is an enlarged view of part B of FIG. 5.
Figure 7:
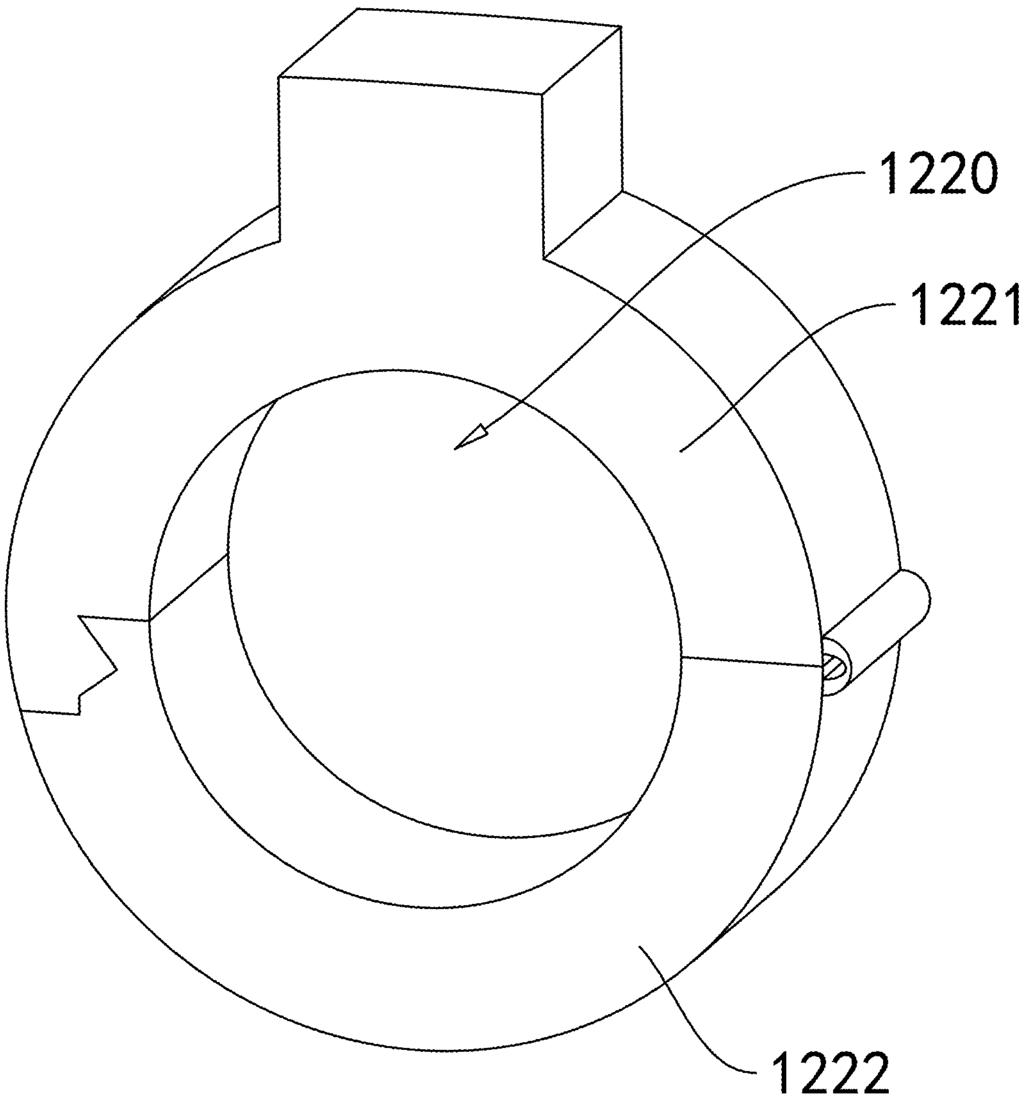
FIG. 7 is a schematic diagram of a locking structure of a fixing block in an embodiment of the present application.

Referring to FIGS. 5, 6, and 7, a plurality of fixing blocks 122 are provided on one side of the channel part 12 that is close to the main body 11. Each fixing block 122 is distributed around the axis of the channel part 12 in a circumferential direction, and is located in the water flow channel 10. Each fixing block 122 is provided with a fixing hole 1220 that is penetrated through.

Referring to FIGS. 2, 3, 5, and 6, when the light strip 3 is placed on the pad body 1, the light strip 3 is located in the water flow channel 10, and the light strip 3 is threaded through each fixing hole 1220 and configured to emit various colors of light. Therefore, when water enters the water flow channel 10 through the water inlet member 2, the light strip 3 is immersed in water, and when water flows inside the water flow channel 10, the light strip 3 follows the flow of water and swings up and down, so that the light emitted by the light strip 3 has a more dynamic effect under a driving of the water flow, and the light strip 3 presents a dynamic luminous effect that follows the flow of water, rendering an luminous effect of the light strip 3 to be better.

Figure 8:
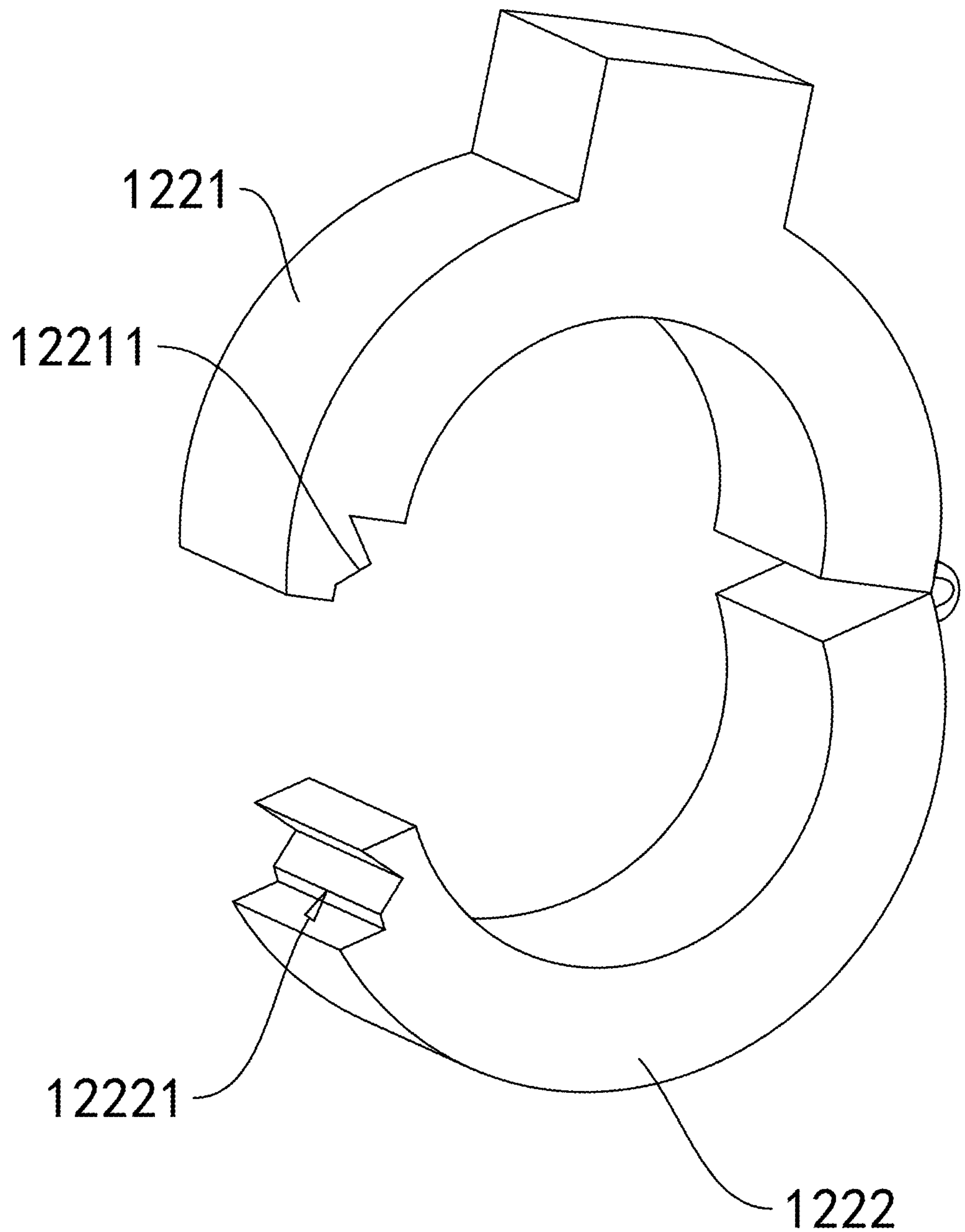
FIG. 8 is a schematic diagram of an unlocking structure of the fixing block in an embodiment of the present application.

Referring to FIGS. 6, 7, and 8, the fixing block 122 includes a first fixing part 1221 and a second fixing part 1222. The first fixing part 1221 is fixedly connected to the channel part 12, that is, the first fixing part 1221 is fixedly connected to an inner wall of the water flow channel 10. One end of the second fixing part 1222 is rotatably connected to one end of the first fixing part 1221, and the other end of the second fixing part 1222 is provided with a clamping slot 12221. The other end of the first fixing part 1221 is fixedly provided with a clamp block 12211. When the other end of the first fixing part 1221 is connected to the other end of the second fixing part 1222, the clamp block 12211 is inserted and clamped into the clamping slot 12221 to achieve a detachable connection between the other end of the first fixing part 1221 and the other end of the second fixing part 1222. At the same time, when the first fixing part 1221 and the second fixing part 1222 are connected, they are close to each other to form a fixing hole 1220, which makes it easier for the light strip 3 to pass through each fixing hole 1220.

Figure 9:
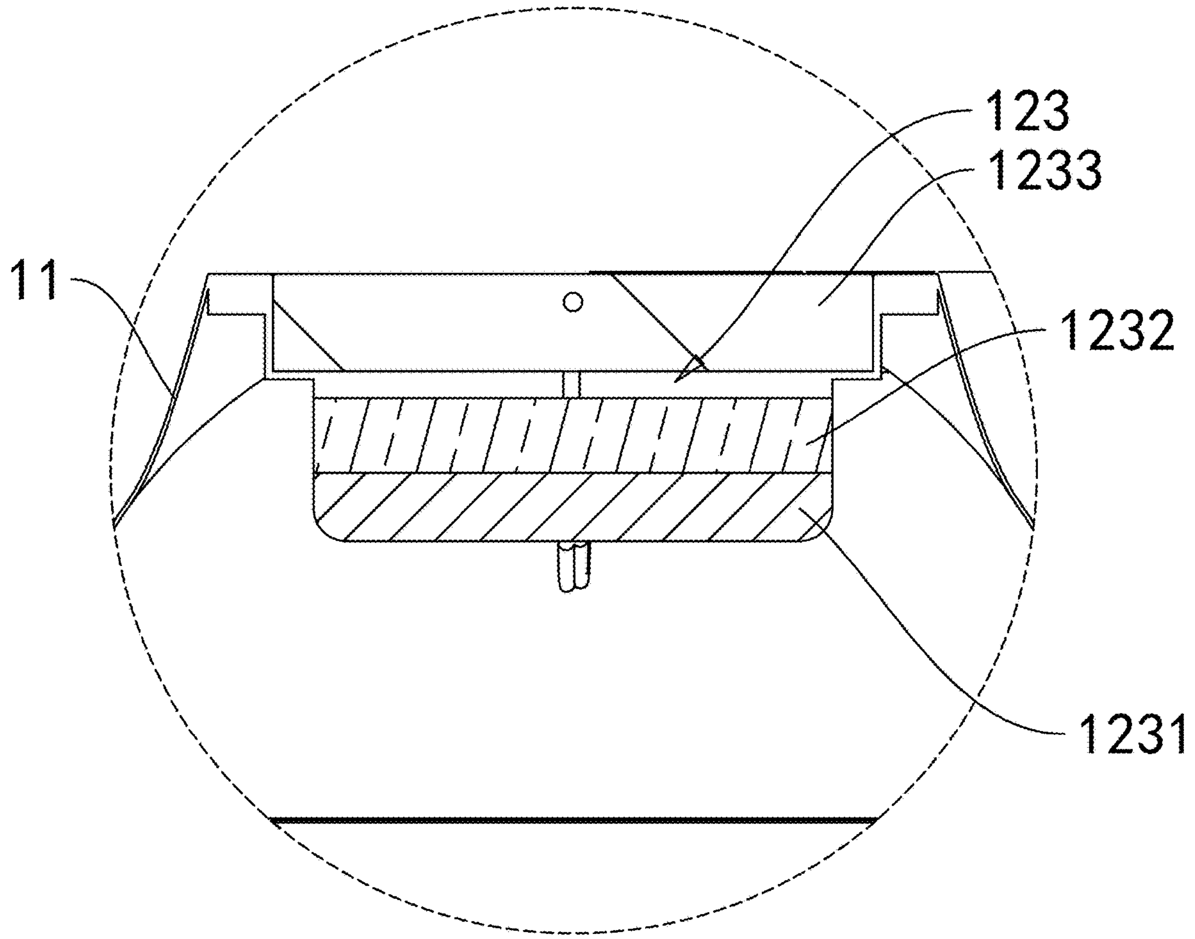
FIG. 9 is an enlarged view of part C of FIG. 5.

Referring to FIGS. 5 and 9, a battery compartment 123 is provided on one side of the channel part 12 away from the main body 11. An interior of the battery compartment 123 is provided with a control module 1231 and a battery module 1232. The control module 1231 is electrically connected to the light strip 3 and control light emission effect and the opening or in closing of the light strip 3. The control module 1231 can be controlled by a remote device, and the battery module 1232 is electrically connected to the control module 1231. The battery compartment 123 is threaded with a battery cover 1233, and the battery cover 1233 seals the battery compartment 123 and facilitates the disassembly of the battery cover 1233, rendering the replacement of the battery module 1232 and the maintenance and care of the control module 1231 more convenient.

The implementation principle of the LED water spray pad in this application is as follows: when the water spray pad is in use, water enters the water flow channel 10 through the water inlet member 2 and flows through each water spray hole 121 along the water flow channel 10. Then, the water is sprayed from each water spray hole 121 under its own pressure, thereby forming a water spray effect. At the same time as the water is sprayed from each water spray hole 121, the light strip 3 provided on the pad body 1 emits various colors of light, rendering the water spray pad have more changes, thereby making the attraction of the water spray pad better and improving the problem of relatively simple changes in the water spray pad and less attraction to children.

The above are the preferred embodiments of the present application and do not limit the protection scope of the present application. Therefore, any equivalent changes made according to the structure, shape, and principle of the present application should be included in the protection scope of the present application.

What is claimed is:

1. An LED water spray pad, comprising:

a pad body, the pad body is provided with one or more water flow channels, the pad body is further provided with one or more water spray holes that are penetrated through, and each water spray bole is communicated to the one or more water flow channels;

one or more light strips, which are provided on the pad body and configured to emit various colors of light;

one or more water inlet members, which are connected to the pad body to allow water to enter the one or more water flow channels through the one or more water inlet members;

wherein the one or more light strips are provided in the one or more water flow channels;

wherein one or more fixing blocks are fixedly provided on an inner wall of the one or more water flow channels, and each of the one or more fixing blocks is provided with a fixing hole that is penetrated through;

when the one or more light strips are provided in the one or more water flow channels, the one or more light strips pass through each fixing hole to fix the one or more light strips to the inner wall of the one or more water flow channels.

2. The LED water spray pad according to claim 1, wherein the one or more fixing blocks comprise a first fixing part and a second fixing part, wherein the first fixing part is fixedly connected to the inner wall of the one or more water flow channels, one end of the second fixing part is rotatably connected to the first fixing part, and the other end of the second fixing part is detachably connected to the first fixing part.

3. The LED water spray pad according to claim 1, wherein the pad body comprises a main body and a channel part, two sides of the channel part are fixedly connected to the main body part and form the one or more water flow channels between the channel part and the main body part;

the channel part is made of transparent material.

4. The LED water spray pad according to claim 1, wherein the pad body is provided with a battery compartment, and a control module and a battery module are provided inside the battery compartment;

the control module is electrically connected to the one or more light strips and controls the one or more light strips to emit light, the battery module is electrically connected to the control module.

5. The LED water spray pad according to claim 4, wherein the battery compartment is detachably connected with a battery cover, and the battery cover seals the battery compartment.

* * * * *